US006532243B1

(12) United States Patent
Leijonhufvud

(10) Patent No.: US 6,532,243 B1
(45) Date of Patent: Mar. 11, 2003

(54) VIRTUAL TIME LOOP

(75) Inventor: Gösta Leijonhufvud, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/120,225

(22) Filed: Jul. 13, 1998

Related U.S. Application Data

(63) Continuation of application No. PCT/SE97/00151, filed on Jan. 31, 1997.

(30) Foreign Application Priority Data

Feb. 2, 1996 (SE) .............................................. 9600386

(51) Int. Cl.[7] .................................................. H04J 3/06
(52) U.S. Cl. ................................... 370/503; 370/395.5
(58) Field of Search ................................. 370/352–356, 370/394, 395, 474, 503–507, 516, 395.5, 395.51, 395.52, 395.53, 395.62; 455/502; 375/342, 354, 220, 222, 356

(56) References Cited

U.S. PATENT DOCUMENTS

| 4,398,289 A | * | 8/1983 | Schoute ...................... 370/348 |
| 4,890,303 A | * | 12/1989 | Bader ......................... 375/356 |
| 4,961,188 A | * | 10/1990 | Lau ............................ 370/517 |
| 5,007,070 A | * | 4/1991 | Chao et al. ................. 375/371 |
| 5,206,857 A | | 4/1993 | Farleigh |
| 5,260,978 A | * | 11/1993 | Fleischer et al. ........... 375/354 |
| 5,373,537 A | | 12/1994 | Oberhauser et al. |
| 5,459,722 A | * | 10/1995 | Sherif ........................ 370/395 |
| 5,555,261 A | | 9/1996 | Nakayama et al. |
| 5,666,366 A | * | 9/1997 | Malek et al. ................ 370/505 |
| 5,790,608 A | * | 8/1998 | Benayoun et al. .......... 375/356 |
| 5,828,696 A | * | 10/1998 | Gelblum et al. ............ 375/222 |
| 5,892,764 A | * | 4/1999 | Riemann et al. ............ 370/401 |
| 6,026,086 A | * | 2/2000 | Lancelot et al. ............ 370/353 |
| 6,072,794 A | * | 6/2000 | Kang ......................... 370/352 |
| 6,094,464 A | * | 7/2000 | Ebringer et al. ............ 375/342 |
| 6,111,878 A | * | 8/2000 | Powell ....................... 370/395 |
| 6,111,879 A | * | 8/2000 | Choi .......................... 370/395 |
| 6,160,805 A | * | 12/2000 | Averbuch et al. ........... 370/350 |
| 6,172,964 B1 | * | 1/2001 | Whitton ..................... 370/230 |
| 6,252,850 B1 | * | 6/2001 | Lauret ........................ 370/235 |

FOREIGN PATENT DOCUMENTS

WO    WO 91/08629    *    6/1991

* cited by examiner

Primary Examiner—Chau Nguyen
Assistant Examiner—Jasper Kwoh
(74) Attorney, Agent, or Firm—Nixon & Vanderhye P.C.

(57) ABSTRACT

For facilitating the synchronization management in a system including a synchronized master and a slave unit communicating over a packet switched network (e.g., ATM network), the clock of a synchronized master unit is recovered by the slave unit by, for example an adaptive mechanism. The slave unit may use the recovered clock for transmission over the network. The depacketizing at the master side may then be performed using a clock signal provided directly from the synchronized network, i.e., without recovering the clock via the adaptive mechanism or the like.

8 Claims, 1 Drawing Sheet

VIRTUAL TIME LOOP

This is a continuation of PCT/SE97/00151, filed Jan. 31, 1997.

TECHNICAL FIELD

The present invention relates to the field of timing in a packet switched network, in particular an ATM network.

BACKGROUND AND STATE OF THE ART

The timing of a digital transmission network is in most applications highly important. It is essential that the transmitting part and the receiving part of the transmission system use the same clock frequency and are in phase with each other. In order to obtain this, some form of synchronization is needed for most applications.

One application which does not need any synchronization is the ATM (Asynchronous Transfer Mode) transmission network. However, many devices or apparatuses connected to an ATM network require some form of synchronization, such as telephone conversation or a video conference.

Furthermore the transmission network used can also involve other transmission systems than the ATM network, such as the Public Switched Telephone Network (PSTN), which is often a synchronized network consisting of e.g. the Plesiochronous Digital Hierarchy (PDH) and the Synchronous Digital Hierarchy (SDH). Thus, the interface between the ATM network and the PSTN must provide a synchronization of the regenerated user data used by the ATM network.

The ATM standard states that the synchronization of the regenerated user data, which are transmitted from a synchronized source or transmitter, is obtained either by means of the Adaptive mechanism or the time stamping mechanism, both described in the existing standard for ATM Adaption layer used for circuit emulation (AAL1 in I363.1).

SUMMARY

It is an object of the present invention to provide a device and a method, which accomplish a less complicated and less costly timing regeneration at the interface between a switched packed network, in particular an ATM network, and a synchronized network.

This object is obtained by means of providing a clock signal at said interface directly from the synchronized network. Thus, the synchronization is maintained. This is obtained in the following manner.

The clock of a synchronized master unit is recovered by a slave unit, e.g. by means of the adaptive mechanism. The slave unit uses the recovered clock for transmission over the packet switched network. The depacketizing at the master side of the system is then performed using a clock signal provided directly from the synchronized network, i.e. without recovering the clock by means of the adaptive mechanism or the like.

Thus, the regenerated user data received from the user terminal is recovered using the transmitting clocking by means of a method closing the time loop at the interface to a synchronized network when the user data is transmitted over an asynchronous packet network to a terminal entity and new data is returned in a synchronous fashion and transmitted back to said interface where timing and data are merged together. Thereby, the method is offering an interface to the synchronized network that is fully in compliance with existing synchronous interfaces, by providing a network interface that is closing the time loop locally and merging it with the user data from the external terminal entity.

BRIEF DESCRIPTION OF THE DRAWINGS

The present invention will now be described in greater detail by way of a non-limiting embodiment with reference to the accompanying drawings, in which.

DETAILED DESCRIPTION

Figure 1:
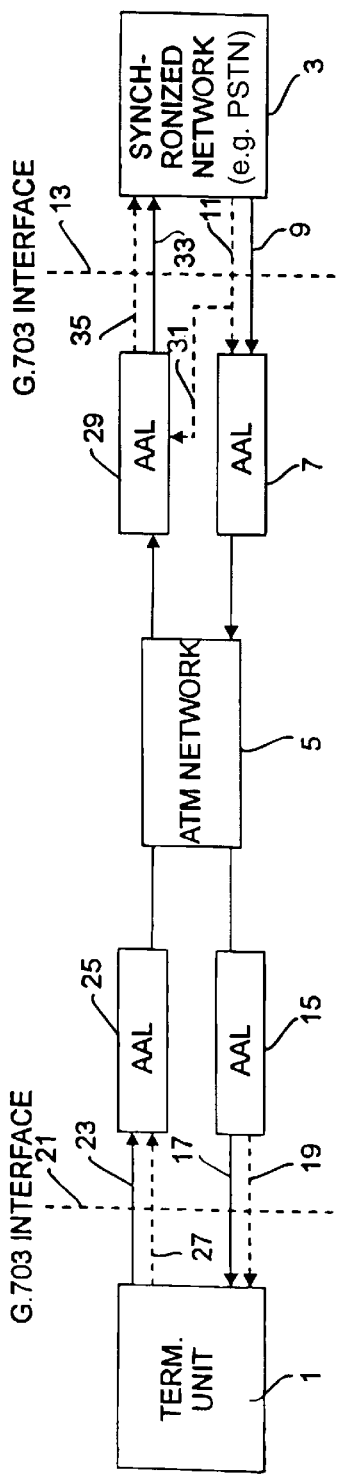
FIG. 1 is a block diagram illustrating a transmission path over an ATM network.

FIG. 1 is a block diagram illustrating a transmission path using an ATM-network. In the diagram a terminal unit 1 wishes to access a synchronized network 3, which for instance can be the Public Switched Telephone Network (PSTN). The access path in this case consists of an ATM (Asynchronous Transfer Mode) network 5.

The terminal unit 1 is in this case assumed to be a synchronized user, such as a telephone. The terminal unit must hence have access to a synchronization or clock signal. This signal can be provided in two different manners according to the ATM standard for circuit emulation (AAL1 in I.363.1).

By means of the adaptive mechanism.

By means of time stamping.

Thus, the duplex communication path between the terminal unit 1 and the synchronized network 3 goes from the synchronized network 3, which is the master of the system illustrated in FIG. 1, to an ATM Adaption Layer (AAL) unit 7, in which data originating from the synchronized network 3 are packetized into ATM cells. In addition of the data the AAL unit 7 receives a clock signal from the synchronized network 3. The data are supplied on a data transmission line 9 and the clock signal is supplied on a clock signal line 11. On their path from the synchronized network 3 to the AAL unit 7 the clock signal and the data signal cross a G.703 interface 13, described in the corresponding standard.

The AAL unit 7 puts the ATM cells on the ATM network 5, which transfers the cells to the receiving end of the network, which in this example is the AAL unit 15. The AAL unit 15 depacketizes the cells which arrive via the ATM network 5. Furthermore, the AAL unit 15 needs to regenerate the data transmission rate in order to synchronize the terminal unit 1, which is the slave in this system, with the synchronized network 3. This is done by means of the adaptive mechanism, which does not require a separate transmission line for obtaining the synchronization.

The data depacketized by the AAL unit 15 along with the regenerated (recovered) clock signal are then transmitted on a data line 17 and a clock line 19 via a G.703 interface 21 to the terminal unit 1. Thus, the terminal unit receives transmitted data and a synchronization signal.

When the terminal unit 1 sends data in the other direction it transmits data on the data line 23 via the G.703 interface 21 to the AAL unit 25. The terminal unit 1 will send its data using a clock that is fully synchronized with the incoming clock, which is provided by the AAL unit 15 by means of the adaptive mechanism. The outgoing timing will therefore be a mirrored representation of the timing received from AAL unit 15 on line 19. The timing signal is transmitted via a clock line 27 also passing the G.703 interface 21. This procedure is fully in line with existing units for synchronous operation.

Then the ATM network 5 transfers the cells to the intended receiver, in this case the synchronized network 3. At the receiving end there is an AAL 29, which depacketizes the cells arriving via the ATM network 5. In order to synchronize the data contained in the arriving cells the AAL 29 needs access to a synchronization signal. This signal can be obtained in the same manner as at the terminal unit end, i.e. by means of the adaptive mechanism.

However, since the terminal unit is a slave in the master/slave relationship between the synchronized network 3 and the terminal unit 1, the terminal unit 1 will be synchronized by the synchronized network. Therefore, the AAL 29 can use the synchronization or clock signal provided to the AAL 7. This is illustrated in the figure by the dotted line 31.

This type of timing scheme is possible, since the AAL unit 29 can presume that the timing of incoming data from the terminal unit 1 is the same as the timing of the data transmitted from the synchronized network. Thus, the G.703 interface is not altered, but remains bidirectional. The AAL unit 29 therefore can transmit data on a line 33, which is synchronized by the clock signal on line 35, with the synchronized network 3.

Figure 2A:
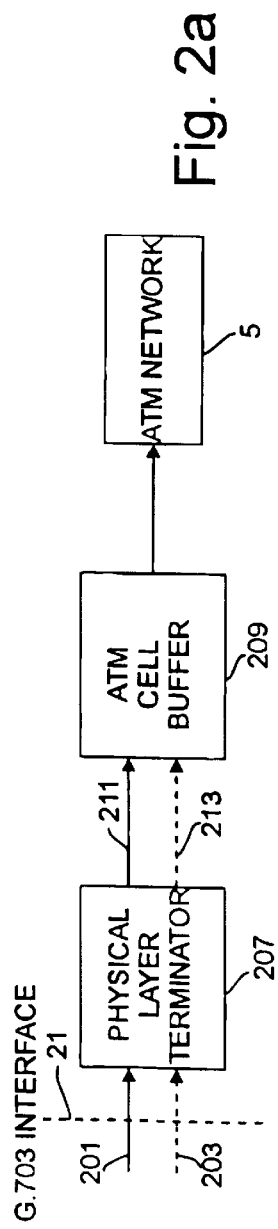
FIGS. 2a–b are schematic views of AAL units.

In FIG. 2a the packetizing of ATM cells is illustrated (i.e., a close-up of the left side of FIG. 1 showing an AAL unit 25). The figure shows data arriving on a line 201 and a clock signal arriving on a line 203. The signals pass the G.703 interface 21 to a physical layer terminator block 207. In the block 207 the data are packetized into cells, which are transferred to a buffer 209 on the line 211. The block 207 also provides the buffer 209 with a clock signal on a line 213. The buffer 209 then puts the cells on the ATM network 5 at the correct times.

Figure 2B:
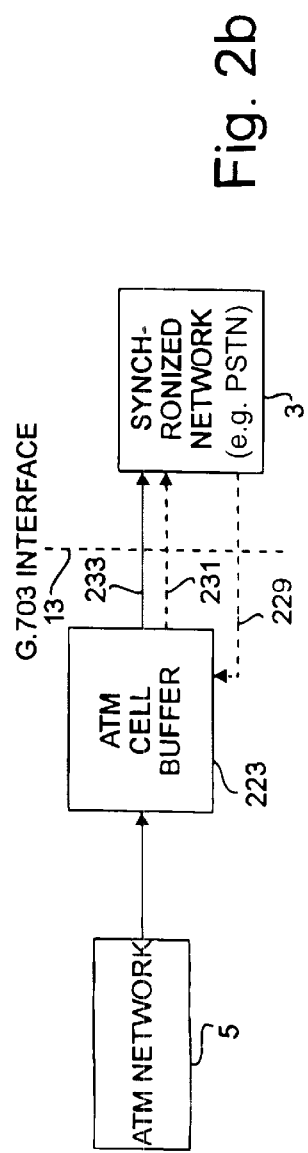

FIG. 2b illustrates the depacketizing of ATM cells at the master side of the transmission system shown in FIG. 1, i.e., at the synchronized network side. In other words, FIG. 2b is a close-up of the right side of FIG. 1, illustrating functionality of AAL unit 29. In FIG. 2b cells arrive from the ATM network 5 to the ATM cell buffer 223, which buffers the arrived cells and places out-of-order arrived cells in order. Further, the buffer 223 depacketizes the cells and the data contained in the cells are put onto the synchronized network 3, via the G.703 interface 13.

In order to synchronize the data stream from the ATM cell buffer 223 a synchronization or clock signal must be provided. A clock signal is therefore connected to the buffer 223, which clock signal comes directly from the synchronized network 3 via the G.703 interface 13 on the line 229 (see line 31 in FIG. 1).

The data is then put onto the synchronized network 3 in a synchronous manner via the data line 233 and the clock line 231.

By using the synchronization scheme described by means of an example above, it will be possible to fully compensate for the large cell delay variation, which is generated by an ATM or another switched packet network, already in the AAL receiver 29 of FIG. 1. This makes it possible to compensate for the phase difference, which remains at this interface if the clocking is regenerated by means of the adaptive mechanism.

By providing the synchronization or clock signal directly from the synchronized network to the ATM buffer the time loop of the system becomes simplified. The scheme described above, however, requires that the timing (clock) recovering at the slave, i.e. the AAL by the terminal unit in the example given above, end is in function, since a malfunction thereof would result in too large deviations in arrivals of cells for the depacketizing ATM cell buffer at the master, i.e the synchronized network in the example above, side of the system to handle.

Thus, a clock scheme, which simplifies the clock mechanism when an ATM network is used as an access network between to units configured in a master—slave relationship has been described.

This is obtained with a system and a method for facilitating the synchronization management in a system comprising a synchronized master and a slave unit communicating over a packed switched network, in particular an ATM network. The clock of a synchronized master unit is recovered by the slave unit, e.g. by means of the adaptive mechanism. The slave unit uses the recovered clock for transmission over the packet switched network. The depacketizing at the master side of the system is then performed using a clock signal provided directly from the synchronized network, i.e. without recovering the clock by means of the adaptive mechanism or the like.

What is claimed is:

1. A method of providing a clock signal for synchronizing data transmitted between a terminal unit and a synchronized circuit-switched network, wherein the terminal unit accesses the synchronized circuit-switched network over a packet switched network, and wherein the terminal unit regenerates a clock from the synchronized circuit-switched network for receiving data over the packet switched network, the method comprising:

deriving a clock signal from the synchronized circuit-switched network at a receiving part of an interface between the synchronized circuit-switched network and the packet switched network, receiving data at the receiving part, said data being transmitted from the packet switched network to the synchronized circuit-switched network, and synchronizing the received data based on the derived clock signal.

2. A method of providing a clock signal for synchronizing data transmitted between a terminal unit and a synchronized network, wherein the terminal unit accesses the synchronized network over a packet switched network, and wherein the terminal unit regenerates a clock from the synchronized network for receiving data over the packet switched network, the method comprising:

deriving a clock signal from the synchronized network at a receiving part of an interface between the synchronized network and the packet switched network, receiving data at the receiving part, said data being transmitted from the packet switched network to the synchronized network, synchronizing the received data based on the derived clock signal, and wherein the receiving part of the interface is an ATM Adaption Layer (AAL) unit, and the synchronized network comprises a PSTN.

3. The method of claim 2, wherein the packet switched network is an ATM network.

4. The method of claim 1, wherein the synchronized circuit-switched network is a PSTN.

5. A transmission system comprising a synchronized circuit-switched network, a packet switched network, a receiving part at an interface between the synchronized circuit-switched network and the packet switched network, and a terminal unit accessing the synchronized circuit-switched network over the packet switched network, wherein said terminal unit comprises:

means for regenerating a clock from the synchronized circuit-switched network for receiving data over the packet switched network, and wherein said receiving part comprises:
- means for deriving a clock signal from the synchronized circuit-switched network, and
- means for synchronizing received data being transmitted from the packet switched network to the synchronized circuit-switched network, based on the derived clock signal.

6. A transmission system comprising a synchronized network, a packet switched network, a receiving part at an interface between the synchronized network and the packet switched network, and a terminal unit accessing the synchronized network over the packet switched network, wherein said terminal unit comprises:
- means for regenerating a clock from the synchronized network for receiving data over the packet switched network, and wherein said receiving part comprises:
- means for deriving a clock signal from the synchronized network,
- means for synchronizing received data being transmitted from the packet switched network to the synchronized network, based on the derived clock signal, and
- wherein the receiving part is an ATM Adaption Layer (AAL) unit, and the synchronized network comprises a PSTN.

7. The transmission system of claim 6, wherein the packet switched network is an ATM network.

8. The transmission system of claim 5, wherein the synchronized circuit-switched network is a PSTN.

* * * * *